United States Patent [19]
Brögger et al.

[11] Patent Number: 5,907,616
[45] Date of Patent: May 25, 1999

[54] METHOD FOR ACCESSING A PORTION OF THE DATA ON A MICROPROCESSOR CARD

[75] Inventors: Roswitha Brögger, Viersen; Matthias Jungemann, Aachen; Günter Maringer, Bonn, all of Germany

[73] Assignee: Mannesmann Aktiengesellschaft, Düsseldorf, Germany

[21] Appl. No.: 08/840,377

[22] Filed: Apr. 29, 1997

[30] Foreign Application Priority Data

Apr. 29, 1996 [DE] Germany .......................... 196 17 943

[51] Int. Cl.[6] ...................................................... H04L 9/00
[52] U.S. Cl. ............................ 380/4; 380/23; 235/380
[58] Field of Search ........................... 380/4, 59, 23; 235/380, 382

[56] References Cited

U.S. PATENT DOCUMENTS

| | | | |
|---|---|---|---|
| 4,709,136 | 11/1987 | Watanabe | 235/379 |
| 5,379,344 | 1/1995 | Larsson et al. | 380/23 |
| 5,544,246 | 8/1996 | Wandelbaum et al. | 380/23 |
| 5,629,508 | 5/1997 | Findley, Jr. et al. | 235/38 R |

FOREIGN PATENT DOCUMENTS

| | | | |
|---|---|---|---|
| 0607767A1 | 7/1994 | European Pat. Off. | G07F 7/10 |
| 0641137A2 | 3/1995 | European Pat. Off. | H04Q 7/38 |
| 0654919A2 | 5/1995 | European Pat. Off. | H04K 9/32 |

*Primary Examiner*—Tod R. Swann
*Assistant Examiner*—Trevor Coddington
*Attorney, Agent, or Firm*—Cohen, Pontani, Lieberman & Pavane

[57] ABSTRACT

A method for accessing at least a portion of the data on a microprocessor card, such as a Subscriber Identity Module (SIM) card having at least one freely accessible card number for use with mobile phones. A separate master card uses a self-contained key and encryption algorithm together with the accessible SIM card number to generate a first identification number that is communicated to and stored on the SIM card during initial programming of the SIM card. When access to data stored on the SIM card is thereafter required, a second identification number is calculated in the same manner, is communicated to the SIM card, and is compared on the SIM card with the stored first identification number. Access to the data stored on the SIM card is granted only when the first and second identification match.

19 Claims, 4 Drawing Sheets

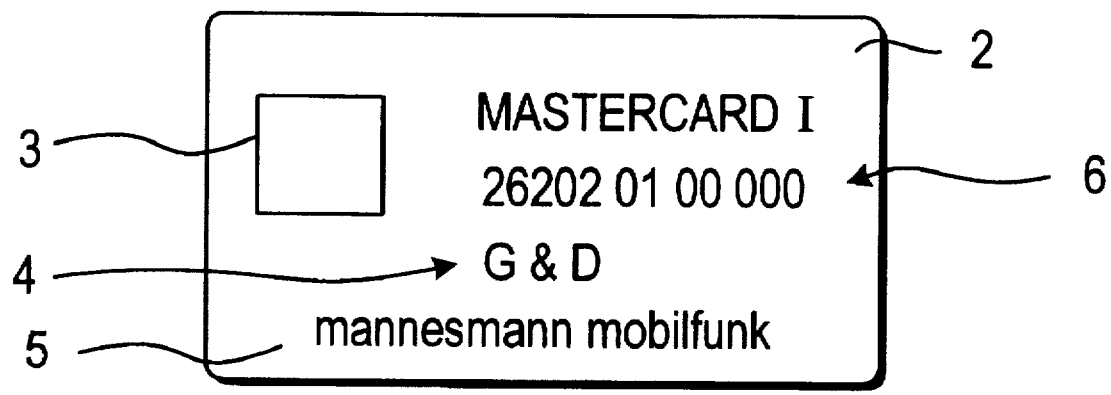
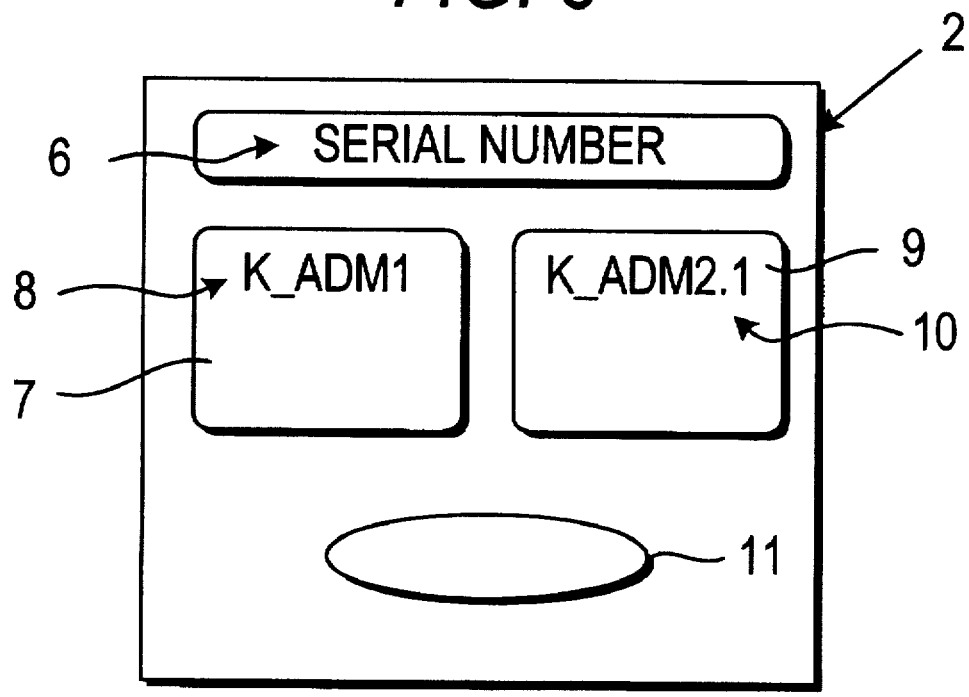

METHOD FOR ACCESSING A PORTION OF THE DATA ON A MICROPROCESSOR CARD

BACKGROUND OF THE INVENTION

1. Field of the Invention

The present invention relates to a method for accessing a portion of the data stored on a microprocessor card and, more particularly, to a method for accessing data stored on Subscriber Identity Module (SIM) cards for mobile phones having a microprocessor and at least one accessible card number.

2. Description of the Related Art

European Patent No. EP 0 607 767 A1 discloses a SIM card that contains a Personal Identity Number (PIN) code that the subscriber must enter to gain access to the mobile phone network. The SIM card checks the PIN entered by the user to determine whether access is authorized; if access is authorized, the mobile phone gains access to special data on the SIM card, with which the mobile phone announces the subscriber to the network operator. This ensures that only authorized persons, i.e. only those having access to or knowing the PIN, can make calls using the SIM card.

In addition, another code, known as the International Mobile Subscriber Identity (IMSI) code, is also stored on the SIM card. European Patent No. EP 0 607 767 A1 further discloses the assignment or personalization of a mobile telephone to a SIM card by means of comparison with the IMSI code. A list of IMSI codes stored in the mobile phone is compared with the IMSI code on the SIM card; only when the codes agree will the mobile phone be activated.

Until now, access to the information stored on SIM cards has been restricted to the issuer of the cards, i.e. the cellular phone company. There is however an unmet need for a method that allows access to at least a portion of the data stored on the SIM card for specific and limited purposes, e.g. by sales and service persons for configuration and quality control.

SUMMARY OF THE INVENTION

It is accordingly an object of the present invention to provide access to at least a portion of the data stored on microprocessor cards, i.e. smart-cards, and especially SIM cards for mobile phones.

In accordance with the present invention, each SIM microprocessor card is programmed by the cellular service provider with a unique, first identification number that is based on the card's serial number, a randomly generated key and an encryption algorithm. This first identification number is stored in the card's microprocessor and is inaccessible to anyone other than the issuer of the card, i.e. the cellular phone company. A unique, second identification number is generated or calculated in the same manner by a sales or service person and is then communicated to the SIM microprocessor card where it is compared with the first identification number. If the two numbers match, then the microprocessor on the SIM card grants access to a limited, predefined portion of the data stored on the SIM card with the accessible portion of the data being defined by the key. Secured access to the data on a microprocessor card, such as a SIM card, is thereby possible since the card can now be read from and written to only by users interfacing with and providing the correct, matching identification number.

The security of the method of the present invention is further enhanced by the fact that the encryption algorithm and at least one key are stored on another card that incorporates a microprocessor, known as a "master card." Advantageously, the master card is required for use in conjunction with a device that is configured for reading from and/or writing to microprocessor SIM cards.

To automate the validation method between a master card and a SIM card, access to the data on the respective cards is controlled by a computer—this also allows the data on the SIM card to be checked automatically such, for example, as during configuration and service.

In a preferred embodiment, a variety of users may gain access to SIM card data in accordance with the present invention. However, these various users will only be permitted to access a limited and predefined portion of the that is data stored on the SIM card, the particular portion depending in each instance on the user and the purpose for which the SIM card data is accessed. To prioritize the various users in respect to their access to data, a multiplicity of unique, randomly generated keys are provided on the master card and on the SIM card, each key being assigned to a specific portion of the stored data. Access to specific portions of the data on the SIM card is thereby controlled in accordance with the present invention while allowing a plurality of different users to access the stored data.

To further enhance security, the key or keys are generated by a random number generator and cannot therefore be duplicated by an unauthorized person.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2 is a front-face view of a master card of the invention;

FIG. 3 is a block diagram of the internal structure of the master card of FIG. 2;

DETAILED DESCRIPTION OF THE PRESENTLY PREFERRED EMBODIMENTS

The present invention provides a method for accessing data stored on a microprocessor card and, in particular, on Subscriber Identity Module (SIM) cards that are commonly used in conjunction with cellular phones. Microprocessor-based cards, such for example as SIM cards, are sometimes referred to as "smart-cards" and typically have a variety of data stored thereon for use by the microprocessor. Access to this data on SIM cards has heretofore been limited to the cellular service provider, i.e. the issuer of the cards. However, it is desirable that sales and service personnel be able to access at least portions of the stored data for configuration, trouble-shooting and service and the like. The method of the present invention provides such access in a secure and novel manner.

In accordance with the invention, both a master card and a SIM card are programmed by the card issuer with at least one unique identification number that is derived from a SIM card number, i.e. a serial number uniquely identifying the card, a predefined algorithm, and a randomly generated numerical key. Access to the data stored on the SIM card will only be available to persons having a master card that has been programmed with the same identification number as the subject SIM card. In addition, the particular or degree of permitted access to the SIM card data is defined by the key when the master card and SIM card are initially programmed. Consequently, any person possessing a master card for a SIM card with matching identification numbers will nevertheless only be able to access a specified and predefined portion of the data that is stored on that particular, corresponding SIM card. It is therefore possible, in accordance with the present invention, to provide a mechanism by which sales and service personnel, for example, may gain access to a particular subset of the data stored on a SIM card for configuration and servicing the card.

Figure 1:
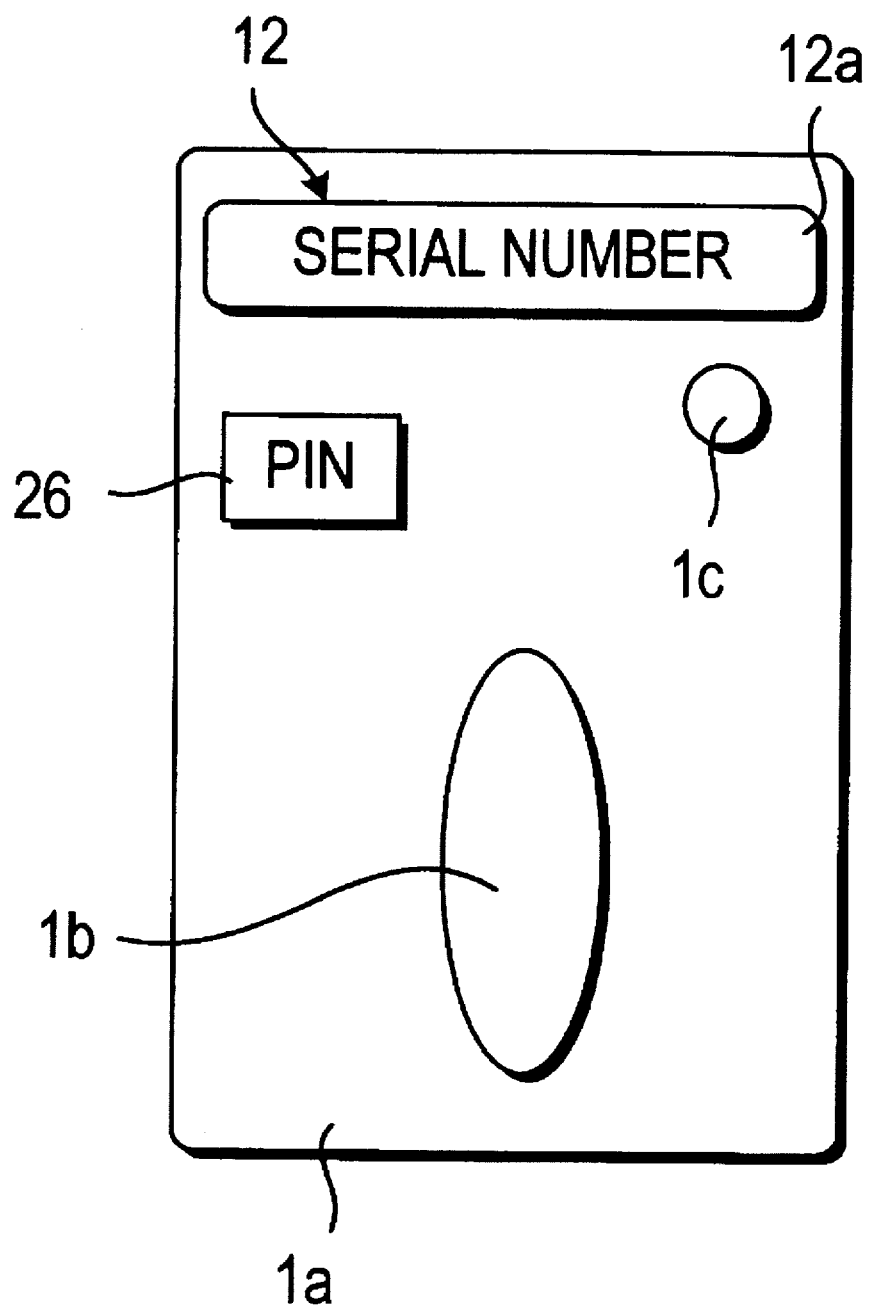
FIG. 1 is a block diagram of the internal structure of a SIM card configured in accordance with the present invention.

Referring now to the drawings, FIG. 1 depicts the internal structure of a microprocessor card 1 configured as a SIM card 1a in accordance with the present invention. As hereinabove noted, SIM cards 1a are commonly used in conjunction with mobile phones to gain access to a mobile phone network pursuant to a predefined communication standard. Usually, each SIM card 1a has a Personal Identification Number (PIN) 26 that the user can change at any time. Furthermore, each SIM card 1a has a serial number 12a that is stored as a special card number 12 which is usually freely accessible and readable by a microprocessor card reading device 30. Of course, other freely accessible card numbers 12 can also be stored on the SIM card 1a. In addition, various data 1b are also stored on the SIM card 1a, such as network-specific data for network access, user data (e.g. short messages, autodial numbers) and the like. The data 1b is typically stored in an on-card memory structure or device or the like and is managed by a microprocessor 1c which is also located on the SIM card 1a. When the correct PIN 26 is entered by the user, the microprocessor 1c validates the number and than grants communication access to the mobile phone network.

Referring next to FIGS. 2 and 3, a master card 2 configured in accordance with the present invention is shown. The master card 2 includes an integral microprocessor 3 that imparts "intelligence" to the card 2. A serial number 6 that uniquely identifies the master card 2, a user name 4 and a system operator name 5, i.e. cellular service provider, are visibly imprinted or embossed or otherwise indicated on the face of the master card 2. In the embodiment shown in FIG. 3, three data fields are provided within the master card 2: a first data field containing the serial number 6, a second data field having a table 7 with at least one key 8 stored therein, and a third data field having a table 9 with at least one key 10 stored therein. The keys 8, 10 are multi-digit numbers that, for security reasons, are randomly generated by a microprocessor such, as is preferred, by the microprocessor 3. Alternatively, a single key may be stored on the master card 2. An encryption algorithm 11 such, for example, as the known Data Encryption Standard (DES) process is also stored on the master card 2. The serial number 6 and keys 8, 10 are programmed into the master card 2 by the card issuer and this stored data are not accessible or modifiable by anyone other than the issuer.

Figure 4:
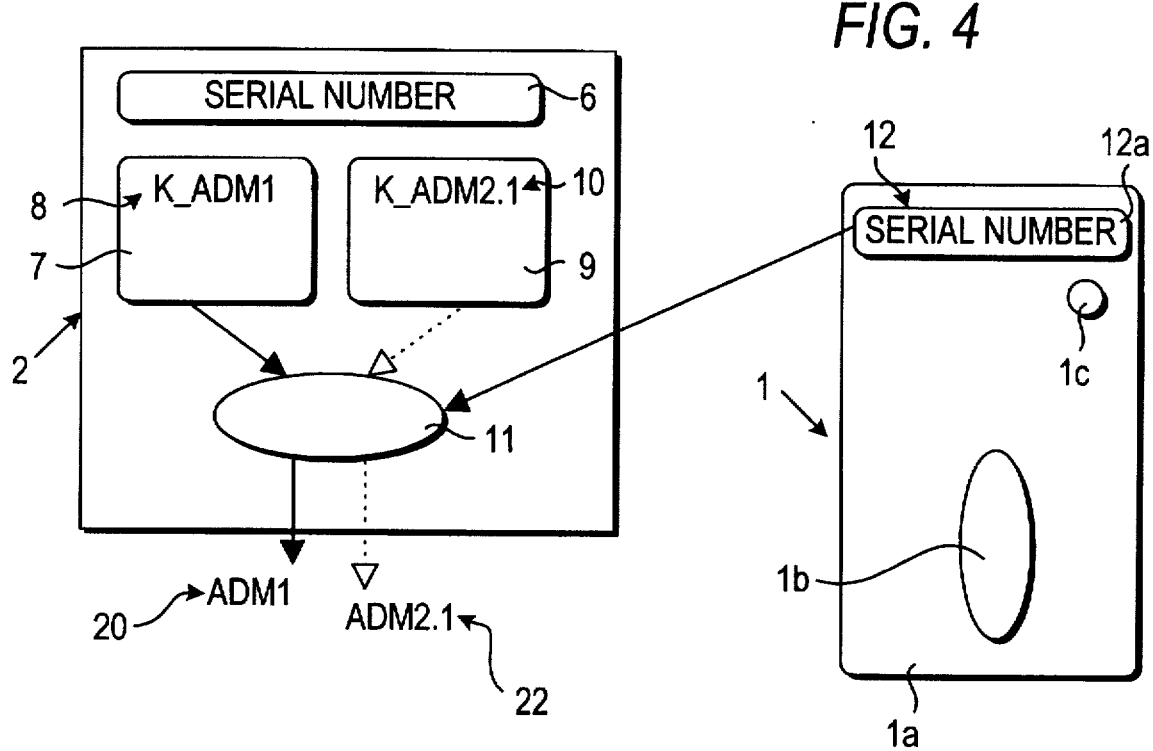
FIG. 4 is a schematic diagram showing the generation of two identification numbers by a master card during the personalization process of a SIM card.
Figure 5:
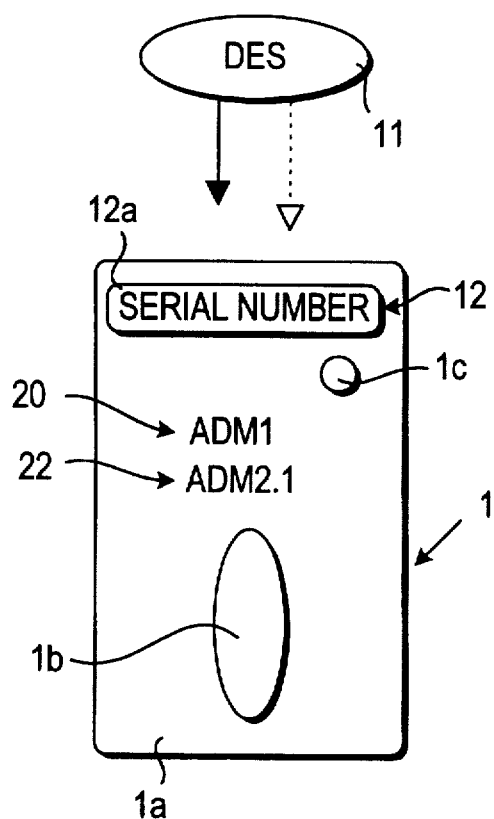
FIG. 5 is a schematic diagram showing the programming of a SIM card with the two identification numbers generated in FIG. 4.

The SIM card 1a is programmed by the card manufacturer with data provided by the card issuer by way of the master card 2 as shown in FIGS. 4 and 5; these drawings depict the preparation of the SIM card 1a for the access method described below. Based on the serial number 12a of the SIM card 1a and the keys 8, 10 and encryption algorithm 11 stored on the master card 2, two identification numbers, 20 (ADM1) and 22 (ADM2.1), are generated by the master card 2 (FIG. 4) and stored on master card 2 and the SIM card 1a (FIG. 5). Where more than one key is used, producing more than one identification number, each identification number is unambiguously assigned or associated with a predetermined portion or subset of the data 1b—access to the specific portions of data 1b stored on the SIM card 1a is accordingly limited and restricted by the particular identification number and the above-described association or assignment. If only one key is present or stored on the card 1a, then the identification number may be assigned to all of the stored data 1b or, alternatively, to only a portion or subset of the stored data 1b. This assignment or association is also stored by means of software on the particular SIM card 1a by the card manufacturer. The keys 8, 10 and algorithm 11, however, cannot be accessed by the card manufacturer except for the limited use permitted for the above-described personalization process.

Figure 6:
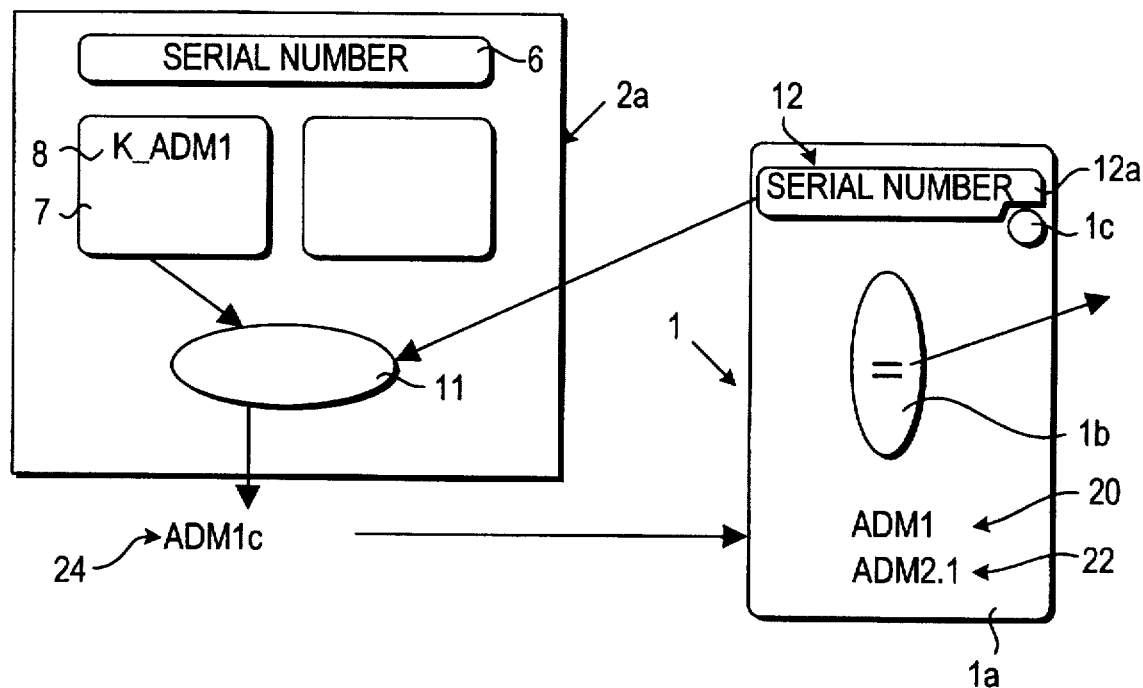
FIG. 6 is a schematic diagram showing the use of a master card having a single key to confirm identification numbers between a master card and a SIM card.

Access to the data 1b stored on the SIM card 1a is only possible after clearance has been granted or approved by the SIM card microprocessor 1c. The individual steps of the method of the present invention to clear a SIM card 1a for access to at least a portion of the stored data 1b are described below with specific reference to FIG. 6. Although the following description assumes that the SIM card 1a includes only a single stored key, it will be apparent to those skilled in the art having knowledge of this disclosure that the method applies equally where more than one key is present or stored.

Figure 7:
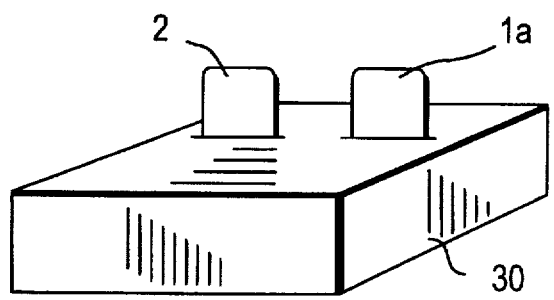
FIG. 7 is a block diagram of a master card and a SIM card inserted into a device for reading from and writing to microprocessor cards.

The method of the present invention employs a master card 2a correspondingly having a single stored key K_ADM1 8 and that has for example been issued to an authorized partner company having a limited access option, i.e. only a portion of the SIM data 1b will be accessible by the partner company using the master card 2a and key K_ADM1 8. To gain access to the stored data 1b on SIM card 1a, e.g. to read or write a portion of the data 1b, a conventional or otherwise known read/write device 30 (see FIG. 7), into which the SIM card 1a and master card 2a are introduced, is employed. The read/write device 30 reads the serial number 12a of the SIM card 1a and the single key K_ADM1 8 from the master card 2a. Then, using the encryption algorithm 11 stored on master card 2a, the read/write device 30 generates an identification number ADM1c 24 from the serial number 12a and key K_ADM1 8 and communicates this number to the SIM card 1a. The SIM card microprocessor 1c then compares the identification number ADM1c 24 with the corresponding pre-programmed identification number ADM1 20 that was generated using the same key and algorithm and stored on SIM card 1a (see FIGS. 4 and 5). If the two identification numbers match, then access to a predefined portion of the data 1b stored on the SIM card 1a is granted by the microprocessor 1c.

The key K_ADM1 8 permits access only to stored data 1b that is assigned to or associated with this key (and thus to the identification number ADM1c 24 generated therefrom). If multiple keys are present or used, then each of the multiple keys may be assigned, by the card issuer, to a specific segment of the stored data 1b and will accordingly allow access to only that predetermined segment of the data 1b. Thus, if a master card 2 with a stored key other than K_ADM1 is used, e.g. with a key K_ADM2.1, it will only be possible to access the stored data 1b that has been assigned specifically to key K_ADM2.1. This arrangement and method thus allows individual users, e.g. individual partner companies, to be prioritized by access rights and the like through the use of various unique keys 8, 10.

The method of the present invention can also be carried out automatically, e.g. by a computer, to thereby automatically implement the approval process between a master card 2 and SIM card 1a and automate manipulation of the stored data 1b for configuration and service, as for software/firmware upgrades, reprogramming of network data, etc.

Unlike a personal identification number (PIN), which is present on every microprocessor card 1 and can normally be changed by the user, the identification numbers generated and stored in accordance with the present invention can generally not be changed by those granted access to the data 1b on the SIM card 1a using a master card 2.

The method of the present invention can also be used in analyzing and repair of defective SIM cards 1a whose malfunctions have been caused by device errors, user errors or other errors. After the defective SIM card 1a is accessed using the master card 2, the errors in question can be analyzed, identified and, if possible and desired, corrected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for accessing data stored on a microprocessor card having a unique and accessible card number using a predefined key and a number generating means, comprising the steps of:

(a) generating a first identification number using the number generating means, the card number and the key;

(b) storing the generated first identification number on the microprocessor card;

(c) introducing the microprocessor card into a device configured for reading from and writing to microprocessor cards;

(d) generating a second identification number using the number generating means, the card number and the key;

(e) communicating the generated second identification number to the microprocessor card through the device;

(f) comparing the first and second identification numbers in the microprocessor card; and (g) providing access to the data stored on the microprocessor card by the device only if said comparison confirms that the first and second identification numbers match.

2. The method of claim 1, wherein the number generating means and the key which are used for generating the second identification number are stored on a master card having a microprocessor.

3. The method of claim 2, wherein said step (c) further comprises introducing the master card into the device configured for reading from and writing to microprocessor cards.

4. The method of claim 1, wherein said step (g) further comprises accessing the stored data under control of a computer.

5. The method of claim 4, wherein said step (g) further comprises automatically validating the data stored on the microprocessor card.

6. The method of claim 1, wherein the key is associated with a fraction of the data stored on the microprocessor card for use in obtaining access to the fraction of the stored data.

7. The method of claim 1, wherein the key comprises a randomly generated number.

8. A method for providing access to otherwise-inaccessible data stored on a microprocessor card having a unique and freely-accessible identification number associated with the card, comprising the steps of:

preparing the microprocessor card by generating a first identification number using the card identification number, a predefined key and an encryption algorithm and storing the generated first identification number on the card; and to provide access to the otherwise-unavailable data stored on the prepared microprocessor card:
  introducing the prepared microprocessor card into a device configured for reading from and writing to microprocessor cards;
  generating in the device a second identification number using the card identification number, the predefined key and the encryption algorithm;
  communicating the generated second identification number to the prepared microprocessor card through the device;
  comparing the first and second identification numbers in the microprocessor card; and
  providing access to the otherwise-inaccessible data stored on the microprocessor card by the device only if said comparison confirms a match of the generated first and second identification numbers.

9. The method of claim 8, wherein the means for generating the second identification number and the key are stored on a master card having a microprocessor.

10. The method of claim 9, further comprising the step of introducing the master card into the device configured for reading from and writing to microprocessor cards prior to generating the second identification number.

11. The method of claim 8, further comprising the step of accessing the stored data under control of a computer.

12. The method of claim 11, further comprising the step of automatically validating the data stored on the microprocessor card.

13. The method of claim 8, wherein the key is associated with a fraction of the data stored on the microprocessor card for use in obtaining access to the fraction of the stored data.

14. The method of claim 8, wherein the key comprises a randomly generated number.

15. A method for providing access to otherwise-inaccessible data stored on a microprocessor card having a unique and freely-accessible identification number associated with the card and a card-stored first identification number generated using the card identification number, a predefined key and an encryption algorithm, said method comprising the steps of:

introducing the microprocessor card into a device configured for reading from and writing to microprocessor cards;

introducing into the device a master card predeterminately associated with the microprocessor card and having stored on the master card the predefined key and the encryption algorithm, so that the master card and the microprocessor card are simultaneously connected to the device;

generating in the device a second identification number using the card-stored identification number from the microprocessor card, the master card-stored predefined key and the master card-stored encryption algorithm;

communicating the generated second identification number to the connected microprocessor card through the device;

comparing the first and second identification numbers in the microprocessor card; and providing access through the device to the otherwise-inaccessible data stored on the microprocessor card only if said comparison confirms a match of the first and second identification numbers.

16. The method of claim 15, further comprising the step of accessing the stored data under control of a computer.

17. The method of claim 16, further comprising the step of automatically validating the data stored on the microprocessor card.

18. The method of claim 15, wherein the key is associated with a fraction of the data stored on the microprocessor card for use in obtaining access to the fraction of the stored data.

19. The method of claim 15, wherein the key comprises a randomly generated number.

* * * * *